United States Patent Office 3,704,302
Patented Nov. 28, 1972

3,704,302
CERTAIN CUMARIN QUINAZOLINONES
Sigeharu Enomoto, Hyogo, Katsunobu Sato, Osaka, and Goichi Suzuki, Hyogo, Japan, assignors to Sumitomo Chemical Co., Ltd., Osaka, Japan
No Drawing. Filed Feb. 10, 1970, Ser. No. 10,296
Claims priority, application Japan, Apr. 18, 1969, 44/30,600; Aug. 22, 1969, 44/66,793; Oct. 4, 1969, 44/79,295; Nov. 13, 1969, 44/91,217; Dec. 27, 1969, 45/1,868
Int. Cl. C07d 99/04
U.S. Cl. 260—256.4 Q    6 Claims

ABSTRACT OF THE DISCLOSURE

Compounds of the formula

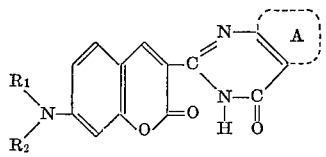

wherein $R_1$ and $R_2$ each represent a hydrogen atom or a substituted or unsubstituted alkyl or a cycloalkyl group, or $R_1$ and $R_2$ can form a heterocyclic ring together with the nitrogen atom attached to the cumarin residue, and ring A represents a substituted or unsubstituted benzene ring or a naphthalene ring are disclosed. They can be employed for dyeing hydrophobic fibers a clear yellow tone with good fastnesses.

DESCRIPTION OF THE INVENTION

The present invention relates to novel cumarin derivatives useful as dyes or coloring agents for hydrophobic fibers and synthetic resins and to a process for producing such cumarin derivatives.

More particularly, the invention relates to novel cumarin derivatvies represented by the general Formula I

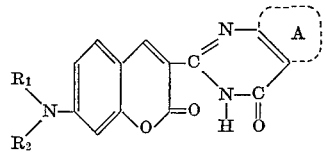    I wherein $R_1$ and $R_2$ each represents a hydrogen atom or a substituted or unsubstituted alkyl or a cycloalkyl group, or $R_1$ and $R_2$ can form a heterocyclic ring containing a hetero-atom or hetero-atoms together with the nitrogen atom attached to the cumarin residue, and ring A represents a substituted or unsubstituted benzene ring or a naphthalene ring. The invention also relates to a process for preparing such cumarin derivatives.

Various compounds have hitherto been known as dyestuffs or coloring agents for hydrophobic fibers and synthetic resins. As a result of the investigations on discovering improved dyestuffs or coloring agents having excellent fastness to, in particular, sunlight, it has been found that excellent dyestuffs or coloring agents can be obtained according to the present invention described below in detail.

Thus, according to the present invention, there is provided novel cumarin derivatives represented by the aforesaid general Formula I.

The novel cumarin derivatives of the present invention are quite valuable compounds. That is, the cumarin derivatives can provide a remarkable clear yellow tone to hydrophobic fibers such as acetate fibers, polyester fibers or polyamide fibers by dyeing or printing these fibers with the cumarin derivatives. Furthermore, these cumarin derivatives can also provide a very clear yellow tone to synthetic resins such as polyethylene, polystyrene, polyvinyl chloride and polymethacrylate.

According to the present invention, the cumarin derivatives of the present invention can be prepared by any of the following four processes.

According to the first embodiment of the process of the present invention, a cumarin derivative of the present invention is prepared by the condensation of a cumarin derivative represented by the general Formula II

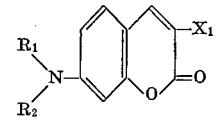    II wherein $R_1$ and $R_2$ are as above defined and $X_1$ represents a carboxylic acid group, a carboxylic acid halide group, a carboxylic acid ester group or a carboxylic acid amide group, with an o-aminobenzamide derivative or a naphthamide derivative represented by the general Formula III

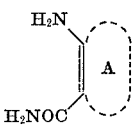    III wherein ring A is as above defined.

According to the second embodiment of the process of the present invention, the cumarin derivative of the present invention is prepared by the condensation of an aldehyde derivative represented by the general Formula IV

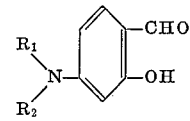    IV wherein $R_1$ and $R_2$ are as above defined, with a 4(3H)-quinazolinone derivative represented by the general Formula V

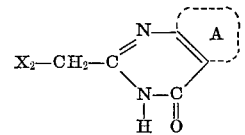    V wherein $X_2$ represents a carboxylic acid group or a derivative thereof, such as a carboalkoxyl group, a carboxylic acid amide group, or a cyano group, and ring A is as above defined, to form a methine derivative represented by the general Formula VI

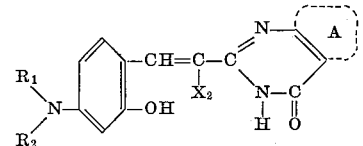    VI wherein $R_1$, $R_2$, $X_2$ and ring A are as above defined, and then ring-closing the methine derivative.

According to the third embodiment of the present invention, the cumarin derivative of the present invention is prepared by the condensation of a cumarin derivative represented by the general Formua II'

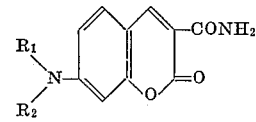    II' wherein $R_1$ and $R_2$ are as above defined with an isatoic acid anhydride derivative represented by the general Formula VII

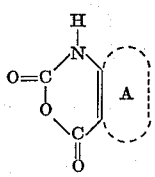

wherein the ring A is as above defined.

According to the fourth embodiment of the present invention, a cumarin derivative is prepared by the condensation of an aldehyde derivative represented by the general Formula IV

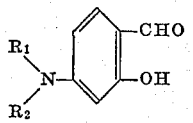

wherein $R_1$ and $R_2$ are as above defined with an acetanilide derivative represented by the general Formula VIII

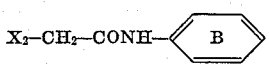

wherein $X_2$ is above defined and the benzene nucleus B can have a substituent other than those groups which impart solubility in water, e.g. carboxylic acid group and sulfonic acid group, or with an acetonaphthyl amide derivative represented by the general Formula IX

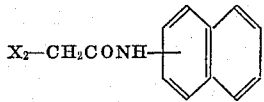

wherein $X_2$ is as above defined to form a methine derivative represented by the general Formula X

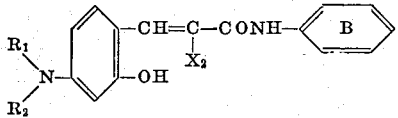

wherein $R_1$, $R_2$, $X_2$ and the benzene nucleus B are as above defined or by the general Formula XI

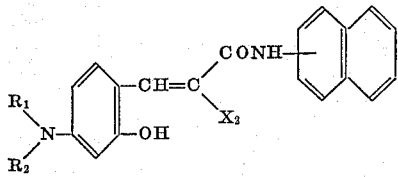

wherein $R_1$, $R_2$ and $X_2$ are as above defined, ring-closing the methine derivative to form a compound represented by the general Formula XII

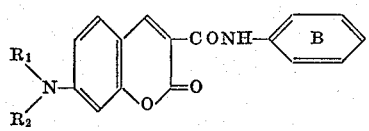

wherein $R_1$, $R_2$ and the benzene nucleus B are as above defined or by the general Formula XIII

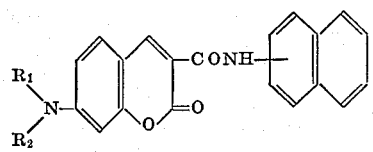

wherein $R_1$ and $R_2$ are as above defined, and reacting the compound thus prepared with urethane.

These processes of the present invention will further be explained in detail.

In the first embodiment of the process of the present invention, the condensation reaction of the cumarin derivative represented by the aforesaid general Formula II and the derivative represented by the general Formula III can be conducted by heating the mixture thereof to temperatures above 150° C. in the presence or the absence of an inert solvent. It is preferable, however, to conduct the condensation reaction at 230–260° C. in a high-boiling inert organic solvent such as diphenyl, a diphenyl ether or a halogenated product thereof.

In the second embodiment of the process of the present invention, the condensation reaction of the aldehyde derivative represented by the general Formula IV and the quinazolinone derivative represented by the general Formula V is carried out at room temperature or at an elevated temperature in the presence or absence of an inert solvent. As suitable solvents used in the process, there are illustrated methanol, ethanol, dioxane, dimethylformamide, dimethylsulfoxide and chloroform. Also, for promoting the reaction a basic catalyst such as piperidine, triethylamine, sodium alcoholate, and the like, can be added to the reaction system.

Furthermore, the ring-closing reaction of the methine derivative represented by the general Formula VI formed from the above-mentioned condensation reaction is generally conducted in an acid medium such as an organic acid or an inorganic acid. It can be conducted by melting the methine derivative.

The compound of the general Formula V to be used in the second embodiment of the present invention, for example, 2-cyanomethyl-4(3H)quinazolinone can be prepared as follows:

o-Aminobenzamide and ethylcyanoacetate are heated at 180–190° C. in nitrobenzene in the presence of a small amount of boric acid and under a nitrogen atmosphere. 2-cyanomethyl-4(3H)-quinazolinone is obtained. The reaction product is cooled to form crystals, the crystals are recovered by filtration and, after being extracted with acetone, recrystallized from ethanol to provide the faint yellow crystals of the aforesaid compound having a melting point of 242–243° C. By hydrolyzing the product properly, 2-carbamoylmethyl-4(3H)-quinazolinone and 2-carboxymethyl-4(3H)-quinazolinone are formed. By esterifying the latter, 2-carboalkoxymethyl-4(3H)-quinazolinone is formed.

In the third embodiment of the process of the present invention, the condensation reaction of the derivative represented by the general Formula II' and the derivative represented by the general Formula VII is conducted by heating them at temperatures of 140–260° C. in the presence or absence of an inert solvent. The reaction is preferably carried out in the presence of boric acid, aluminum chloride, or zinc chloride and it is further advantageous to remove the water formed during the reaction by an azeotropic distillation with a solvent such as nitrobenzene.

In the fourth embodiment of the present invention, the condensation reaction of the aldehyde derivative represented by the general Formula IV and the derivative represented by the general Formula VIII or IX is conducted at room temperature or at an elevated temperature in the presence or absence of an inert solvent. As suitable solvents used in the process, there are illustrated methanol, ethanol, dioxane, dimethylformamide, dimethylsulfoxide, and chloroform. Furthermore, for promoting the reaction a catalyst such as triethylamine, diethylamine, sodium alcoholate, piperidine and the like, can be added to the reaction system.

The ring-closing reaction of the compound represented by the general Formula X or XI is generally conducted in an acid medium such as an inorganic acid or an organic acid. It can be conducted by melting the compound.

The reaction of the compound represented by the general Formula XII or XIII and urethane to form the quinazolinone ring is conducted by heating the ingredients in the absence of a solvent or preferably in an organic solvent such as benzene, toluene, xylene, chlorobenzene and the like, in the presence of a compound having the ability to remove water or alcohol, such as phosphorous pentoxide or pyrophosphoric acid.

Examples of substituents suitable for $R_1$ and $R_2$ in the general Formula I above are hydrogen, a methyl group, an ethyl group, a butyl group, a β-chloroethyl group, a β-hydroxyethyl group, a β-cyanoethyl group, a γ-cyanopropyl group, a β-methoxyethyl group, a β-acetoxyethyl group, a carbomethoxymethyl group, a benzyl group, a phenethyl group, and a cyclohexyl group. Furthermore, the suitable examples of the heterocyclic ring containing a hetero atom or hetero atoms formed by $R_1$ and $R_2$ together with the nitrogen atom is a piperidino ring or a morpholino ring.

Where ring A in the general Formula I is a substituted or unsubstituted benzene nucleus, ring A is represented by the general formula

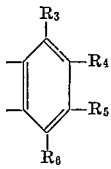

wherein $R_3$, $R_4$, $R_5$ and $R_6$ each represents a hydrogen atom, a halogen atom, a lower alkyl group, a lower alkoxy group, a nitro group, a thiocyano group, an alkanoyl group, a carboalkoxy group, a carbamoyl group, an alkylsulfonyl group, a sulfonamide group, an N-alkyl or an N,N-dialkylsulfoamide group.

In dyeing or printing fabrics, the cumarin derivative of this invention, represented by the general Formula I, is preferably employed in the form of a paste or powder. The paste is prepared from an aqueous dispersion produced by grinding the cumarin compound finely and dispersing the cumarin compound in an aqueous medium together with a suitable dispersing agent. The powder can be prepared from the dispersion by spray drying.

The dyestuffs thus prepared can be used for dyeing or printing various fibers in the conventional manner. When treating polyester fibers, e.g., polyethylene terephthalate fibers, it is advantageous to add the dyestuff to an aqueous medium in which the fibers have been immersed and to carry out the dyeing procedure under a pressure at temperatures above 105° C., preferably 110–140° C. Also, the dyeing procedure can be accomplished in the presence of a carrier such as o-phenylphenol or trichlorobenzene at comparatively high temperatures under refluxing. Still further, the dyeing procedure can be conducted by a so-called thermosol process wherein the dispersion of the dyestuff is applied to fabrics by padding and the fabric is thermofixed by dry hot air for from 30 seconds to 10 minutes at 150–230° C.

Also, in printing, the dispersion of the dyestuff can be kneaded with a suitable starch paste, and the mixture can be applied to fabrics or cloths to be printed by padding. Thereafter, the printing can be attained by a steaming or thermosol process.

Furthermore, cellulose acetate fibers such as cellulose diacetate fibers are preferably dyed with the dyestuff of the present invention at temperatures of 80–85° C., while cellulose triacetate fibers or polyamide fibers are preferably dyed in a dye bath which is in a boiling state.

The cumarin derivatives of the present invention represented by the general Formula I have excellent tinting strength for the aforesaid fibers and result in dyed fibers having an extremely clear fluorescent yellow color with excellent fastnesses to light, sublimation and washing. These advantages of the cumarin derivatives of the present invention have never been obtained by conventional yellow disperse dyes.

Further, when the cumarin derivative of the present invention is used together with an anthraquinone blue dye, a clear green colored fibrous article having sufficient fastness to sunlight can be obtained.

Moreover, the dyestuffs of the present invention have a property of scarcely staining cotton and wool, and therefore quite preferable results can be obtained by using the dyestuffs for dyeing union fibers of cotton or wool and hydrophobic fibers.

Hereinafter, the invention will be explained by the following examples but it should be understood that the examples are given by way of illustration only.

Parts in the examples are by weight if not otherwise stated.

EXAMPLE 1

A mixture of 14.5 parts of 7-diethylaminocumarin-3-carboxylic acid ester and 20.4 parts of o-aminobenzamide was mixed with 100 parts of diphenyl and after further adding 0.2 part of boric acid, the resultant mixture was melted by heating in a nitrogen stream. The mixture was heated at 250–255° C. for 5–6 hours and cooled, whereby the reaction system was solidified. The solidified product was then mixed with 150 parts of benzene and the mixture was heated to 60–70° C. and cooled to form yellow crystals, which were recovered by filtration, washed with benzene and then with an alcohol and recrystallized from a mixture of toluene and pyridine to provide the yellow crystals having a melting point of 267–268° C. The result of the elementary analysis of the product showed that the product corresponding to a compound of $C_{21}H_{19}O_3N_3$ having the formula

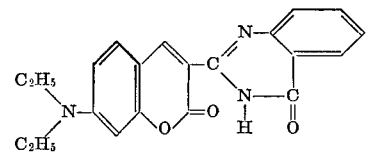

The compound thus prepared emitted a yellow fluorescent color and when acetate fibers, polyester fibers or polyamide fibers were dyed by the compound, the fibers were endowed with a clear yellow tone emitting fluorescence and showing excellent fastness to sunlight, sublimation, and washing. Also, when the compound was used for coloring synthetic resins, the compound gave a clear yellow tone to the resins.

When the same procedure as above was followed with the exception that 5-methyl-o-aminobenzamide or 5-methoxy-o-aminobenzamide was used instead of o-aminobenzamide, similar compounds having a melting point of 278–280° C. and a melting point of 226–228° C. respectively, which were confirmed to have the following formulas

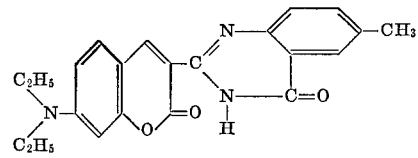

and

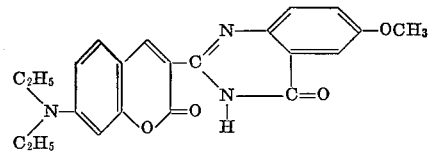

were obtained. These compounds also dyed hydrophobic fibers and synthetic resins a clear yellow color and the dyed products showed excellent fastnesses.

EXAMPLE 2

A mixture of 14.5 parts of 7-diethylaminocumarin-3-carboxylic acid ethyl ester and 27.9 parts of 1-amino-2-naphthoic acid amide was mixed with 100 parts of diphenyl and after adding 0.2 part of boric acid, the resultant mixture was melted by heating in a nitrogen gas stream. The mixture was heated at 250–255° C. for 5–6 hours with stirring and the reaction product was cooled and solidified. The solidified product was mixed with 150 parts of benzene and after heating the mixture to 60–70° C., the mixture was cooled to precipitate yellow crystals which were recovered by filtration, washed with benzene and then with alcohol, and recrystallized from a mixture of pyridine and toluene to provide beautiful yellow crystals.

The compound showed a single component on a thin layer chromatograph and by an elementary analysis the compound was confirmed to correspond to a compound of $C_{25}H_{21}O_3N_3$ having the following structure.

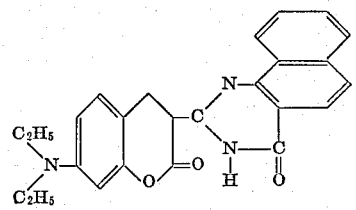

Also, the above procedure was followed using 2-amino-3-naphthoic acid amide instead of 1-amino-2-naphthoic acid amide and a similar compound having the following formula was obtained

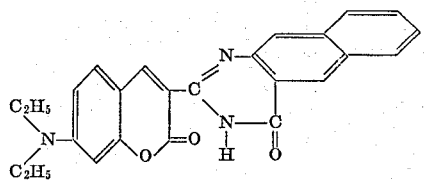

The compound also dyed hydrophobic fibers and synthetic resins a light yellow emitting fluorescence. The dyed articles showed excellent light fastness.

EXAMPLES 3–32

In the following table are shown examples of the cumarin derivatives of the present invention prepared in a manner similar to Example 1 and Example 2. The compounds in the table are shown, according to the substituents $R_1$, $R_2$, and ring A in the general Formula I.

| Ex. | $R_1$ | $R_2$ | A |
|---|---|---|---|
| 3 | —$CH_3$ | —$CH_3$ |  |
| 4 | —$CH_3$ | —$CH_3$ | 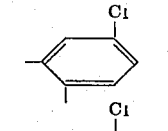 |
| 5 | —$C_2H_5$ | —$C_2H_5$ | 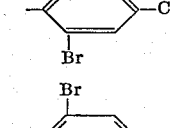 |
| 6 | —$C_2H_5$ | —$C_2H_5$ | 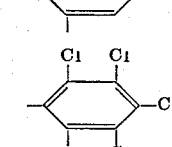 |
| 7 | —$C_2H_5$ | —$C_2H_5$ | 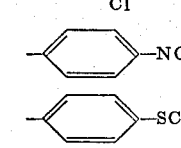 |
| 8 | —$C_2H_5$ | —$C_2H_5$ | 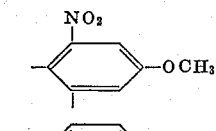 |
| 9 | —$C_2H_5$ | —$C_2H_5$ | 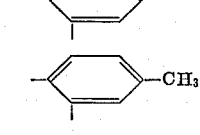 |
| 10 | —$C_2H_4CN$ | —$CH_3$ | 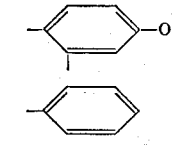 |
| 11 | —$C_2H_4Cl$ | —$CH_3$ | 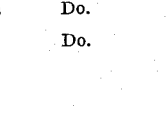 |
| 12 | —$C_2H_4OH$ | —$C_2H_4OH$ |  |
| 13 | —$CH_2CH_2OCH_3$ | —$CH_2CH_2OCH_3$ | |
| 14 | —$C_2H_4OCOCH_3$ | —$C_2H_4OCOCH_3$ | Same as above. |
| 15 | —$CH_2CH_2COOCH_3$ | —$CH_2CH_2COOCH_3$ | Do. |
| 16 | —$CH_2$— | H | Do. |

TABLE—Continued

| Ex. | R₁ | R₂ | A |
|---|---|---|---|
| 17 | {phenyl-H} | H | phenyl |
| 18 | | −CH₂CH₂−O−CH₂CH₂−N− (morpholino) | |
| 19 | | HN(−CH₂CH₂−)(−CH₂CH₂−)N− (piperazino) | phenyl |
| 20 | −CH₃ | −CH₃ | naphthyl |
| 21 | −C₂H₅ | −C₂H₄CN | Same as above; |
| 22 | −C₂H₅ | −C₂H₅OH | naphthyl |
| 23 | −C₂H₅ | −C₂H₄Cl | Same as above; |
| 24 | −C₂H₄OH | −C₂H₄OH | Do. |
| 25 | −C₂H₅ | −C₂H₄OCH₃ | naphthyl |
| 26 | −C₂H₅ | −C₂H₄OCOCH₃ | naphthyl |
| 27 | −C₂H₄COOCH₃ | −C₂H₄COOCH₃ | naphthyl |
| 28 | H | −CH₂−phenyl | −CH₂−phenyl |
| 29 | | {H−phenyl−} H | naphthyl |
| 30 | | −CH₂CH₂−O−CH₂CH₂−N− (morpholino) | Same as above; |
| 31 | | Same as above; | naphthyl |
| 32 | | HN(−CH₂CH₂−)(−CH₂CH₂−)N− (piperazino) | naphthyl |

EXAMPLE 33

A mixture of 18.5 parts of 2-cyanomethyl-4(3H)-quinazolinone and 19.3 parts of 4-diethylamino-2-hydroxybenzaldehyde was added to 150 parts of ethanol and to the mixture was added dropwise 1 part of piperidine with stirring. When the resultant mixture was stirred for 24 hours at room temperature, yellow-brown crystals gradually began to be precipitated. The crystals were found to be α-[4′(3′H)-quinazolonyl-2′]-β-(2″-hydroxy-4‴-diethylaminophenyl)-acrylonitrile. The crystals were then recovered by filtration and recrystallized from chlorobenzene to provide pure fine yellow crystals of a methine compound having a melting point of 244–245° C.

When a mixture of 3.6 parts of the product and 90 parts of 3.5% hydrochloric acid was heated for 6 hours at 95–100° C., the crystals which were yellow-brown at the beginning were converted into the light yellow crystals of the cumarin derivative, which were cooled and after neutralizing the excessive acid with sodium acetate, recovered by filtration and washed well with water. The crystals thus obtained were recrystallized from a mixture of pyridine and toluene to provide yellow crystals having a melting point of 267–268° C. The crystals were confirmed, by an elementary analysis, to be the compound having the following formula

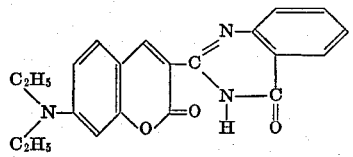

The compound prepared above emitted a yellow fluorescence and when the compound was used to dye acetate fibers, polyester fibers or polyamide fibers, the compound gave light yellow tone to the fibers and the dyed articles showed excellent fastness to sunlight, sublimation and washing.

The 2-cyanomethyl-4(3H)-quinazolinone used in the above process was prepared as follows. That is, 17.0 parts of ethyl cyanoacetate, 13.6 parts of o-aminobenzamide, and 0.5 part of boric acid were added to 120 parts of nitrobenzene, the mixture was heated for 10 hours at 180–190° C. in a nitrogen gas stream, and the product was cooled to form yellow crystals, which were collected by filtration, washed with methanol, extracted with acetone while heating, and after distilling off the acetone, recrystallized from ethanol, to provide light yellow crystals of 2-cyanomethyl - 4(3H) - quinazolinone having a melting point of 242–243° C.

EXAMPLES 34–60

When the same procedure as above was followed using 2-carbamoylmethyl - 4(3H) - quinazolinone, 2-carboxymethyl - 4(3H) - quinazolinone, or 2-carboethoxymethyl-4(3H)-quinazolinone instead of 2-cyano-4(3H)-quinazolinone, similar cumarin derivatives were also obtained.

Other examples of the valuable cumarin derivatives prepared by procedures similar to the above are illustrated in the following table:

| Ex. | $R_1$ | $R_2$ | A |
|---|---|---|---|
| 34 | $-C_2H_5$ | $-C_2H_5$ | —⟨phenyl⟩—$CH_3$ |
| 35 | $-C_2H_5$ | $-C_2H_5$ | —⟨phenyl⟩—$OCH_3$ |
| 36 | $-C_2H_5$ | $-C_2H_5$ | —⟨naphthyl⟩ |
| 37 | $-CH_3$ | $-CH_3$ | —⟨phenyl⟩—Cl |
| 38 | $-C_2H_5$ | $-C_2H_5$ | —⟨phenyl⟩—$SO_2CH_3$ |
| 39 | $-C_2H_5$ | $-C_2H_5$ | —⟨phenyl⟩—$SO_2N(CH_3)_2$ |
| 40 | $-C_2H_4CN$ | $-CH_3$ | —⟨phenyl⟩—$SO_2NH_2$ |
| 41 | $-C_2H_4Cl$ | $-CH_3$ | —⟨phenyl⟩ |
| 42 | $-C_2H_4OH$ | $-CH_3$ | Same as above. |
| 43 | ⟨phenyl⟩—$CH_2$— | H | —⟨phenyl⟩—$SO_2NHC_2H_5$ |
| 44 | ⟨phenyl⟩—$CH_2CH_2$— | H | —⟨phenyl⟩ |
| 45 | ⟨phenyl-H⟩ | H | —⟨phenyl⟩—$CONH_2$ |
| 46 | $-CH_3$ | $-CH_3$ | —⟨phenyl⟩—$COOCH_3$ |

TABLE—Continued

| Ex. | R₁ | R₂ | A |
|---|---|---|---|
| 47 | —C₂H₅ | —C₂H₅ | –⟨phenyl⟩–COCH₃ |
| 48 | —C₂H₅ | —C₂H₅ | –⟨phenyl⟩ with Cl (para) |
| 49 | —C₂H₅ | —C₂H₅ | –⟨phenyl⟩ with CH₃ (para) |
| 50 | —C₂H₅ | —C₂H₅ | –⟨phenyl⟩ with Cl, Cl, Cl, Cl (tetrachloro) |
| 51 | —C₂H₅ | —C₂H₅ | –⟨phenyl⟩–NO₂ |
| 52 | —C₂H₅ | —C₂H₅ | –⟨phenyl⟩–SCN |
| 53 | —C₂H₅ | —C₂H₅ | –⟨phenyl⟩ with NO₂ and OCH₃ |
| 54 | C₂H₅ | —C₂H₅ | –⟨phenyl⟩ with Br, Br |
| 55 | —C₂H₄OCH₃ | —C₂H₄OCH₃ | –⟨phenyl⟩ |
| 56 | —C₂H₄OCOCH₃ | —C₂H₄OCOCH₃ | Same as above. |
| 57 | —C₂H₄COOCH₃ | —C₂H₄COOCH₃ | Do. |
| 58 | {—CH₃, —CH₃} | | –⟨naphthyl⟩ |
| 59 | morpholino (O(CH₂CH₂)₂N—) | | –⟨phenyl⟩ |
| 60 | piperazino (HN(CH₂CH₂)₂N—) | | Same as above. |

EXAMPLE 61

A mixture of 26.0 parts of 3-carbamoyl-7-diethylamino-cumarin and 16.3 parts of anhydrous isatoic acid was mixed with 200 parts of nitrobenzene and after adding theerto 0.4 part of boric acid, the resultant mixture was heated in a nitrogen gas stream. While removing water formed by azeotropic distillation with nitrobenzene, the system was heated for 5-6 hours at 170–180° C. and then cooled to form yellow crystals, which were recovered by filtration, washed with toluene and then an alcohol, and recrystallized from a mixture of toluene and pyridine to provide yellow crystals having a melting point of 267–268° C. The product was confirmed by an elementary analysis to have the following structure:

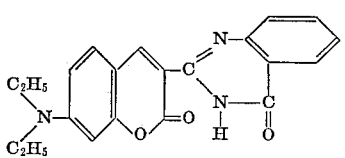

The compounds thus obtained could dye acetate fibers, polyester fibers, and polyamide fibers in light yellow and also the dyed articles showed excellent fastness to sunlight, sublimation, and washing.

EXAMPLES 62–90

Examples of the valuable and novel dyestuffs of the present invention prepared as in Example 61 are shown in the following tbale, in which the compounds are described by $R_1$, $R_2$, and ring A in the general formula I described above.

| Ex. | $R_1$ | $R_2$ | A |
|---|---|---|---|
| 62 | —$CH_3$ | —$CH_3$ | -⟨ ⟩-$CH_3$ |
| 63 | —$C_2H_5$ | —$C_2H_5$ | -⟨ ⟩-$CH_3$ |
| 64 | —$C_2H_5$ | —$C_2H_5$ | -⟨ ⟩-$OCH_3$ |
| 65 | —$C_2H_5$ | —$C_2H_5$ | -⟨naphthyl⟩ |
| 66 | —$CH_3$ | —$CH_3$ | -⟨ ⟩-Cl |
| 67 | —$C_2H_5$ | —$C_2H_5$ | -⟨ ⟩-$SO_2CH_3$ |
| 68 | —$C_2H_5$ | —$C_2H_5$ | -⟨ ⟩-$SO_2N(CH_3)_2$ |
| 69 | —$C_2H_4CN$ | —$CH_3$ | -⟨ ⟩-$SO_2NH_3$ |
| 70 | —$C_2H_4Cl$ | —$CH_3$ | -⟨ ⟩ |
| 71 | —$C_2H_4OH$ | —$CH_3$ | Same as above |
| 72 | $C_6H_5CH_2$— | H | -⟨ ⟩-$SO_2NHC_2H_5$ |
| 73 | $C_6H_5CH_2CH_2$— | H | -⟨ ⟩ |
| 74 | —⟨C_6H_{11}⟩H | H | -⟨ ⟩-$CONH_2$ |
| 75 | —$CH_3$ | —$CH_3$ | -⟨ ⟩-$COOCH_3$ |
| 76 | —$C_2H_5$ | —$C_2H_5$ | -⟨ ⟩-$COCH_3$ |
| 77 | —$C_2H_5$ | —$C_2H_5$ | -⟨ ⟩ with Cl (ortho) |
| 78 | —$C_2H_5$ | —$C_2H_5$ | -⟨ ⟩ with $CH_3$ (ortho) |
| 79 | —$C_2H_5$ | —$C_2H_5$ | -⟨ ⟩ tetrachloro |

TABLE—Continued

| Ex. | R₁ | R₂ | A |
|---|---|---|---|
| 80 | —C₂H₅ | —C₂H₅ | —⟨phenyl⟩—NO₂ |
| 81 | —C₂H₅ | —C₂H₅ | —⟨phenyl⟩—SCN |
| 82 | —C₂H₅ | —C₂H₅ | —⟨phenyl(NO₂)⟩—OCH₃ |
| 83 | —C₂H₅ | —C₂H₅ | —⟨phenyl(Br)⟩—Br |
| 84 | —C₂H₄OCH₃ | —C₂H₄OCH₃ | —⟨phenyl⟩ |
| 85 | C₂H₄OCOOCH₃ | C₂H₄OCOOCH₃ | Same as above. |
| 86 | —C₂H₄COOCH₃ | —C₂H₄COOCH₃ | Do. |
| 87 | —C₂H₄OCOCH₃ | —C₂H₄OCOCH₃ | Do. |
| 88 | —CH₃ | —CH₃ | —⟨naphthyl⟩ |
| 88 | \multicolumn{2}{c|}{O(CH₂CH₂)₂N—} | —⟨phenyl⟩ |
| 90 | \multicolumn{2}{c|}{HN(CH₂CH₂)₂N—} | —⟨phenyl⟩ |

EXAMPLE 91

A mixture of 8.0 parts of cyanoacetic acid anilide and 9.7 parts of 4-diethylamino-2-hydroxybenzaldehyde was mixed with 75 parts of dioxane and after adding dropwise 0.5 part of piperidine to the mixture with stirring, the system was further stirred for 24 hours at 30–35° C., whereby yellow crystals began to precipitate gradually, which were confirmed to be the crystals of α-carboanilide-β-(2′-hydroxy-4′-diethylaminophenyl)-acrylonitrile. The crystals were collected by filtration and recrystallized from chlorobenzene to provide the fine yellow crystals of a methine compound having a melting point of 192–194° C.

When 4.2 parts of the compound prepared above was heated for 6 hours at 95–100° C., together with 100 parts of 2% hydrochloric acid, the yellow-brown crystals were converted into light yellow crystals of a cumarin derivative. After cooling, the reaction product was neutralized with an aqueous solution of 5% soda ash and then the crystals were recovered by filtration and washed with water to provide the light yellow crystals of 3-carboanilide-7-diethylaminocumarin having a melting point of 202–204° C.

Thereafter, 3.4 parts of the cumarin derivative prepared and 1.2 parts of urethane were added to 25 parts of toluene and after adding thereto 11.2 parts of phosphorus pentaoxide with stirring, the resultant mixture was refluxed for 8 hours at 110° C. to form a quinazolinone ring. When the reaction product was poured in ice-cooled water and the system was neutralized with an aqueous sodium hydroxide solution, the product was obtained as yellow crystals, which were then recrystallized from a solvent mixture of pyridine and toluene to provide the yellow crystals of a pure cumarin derivative having a melting point of 267–268° C. The compound was confirmed, by an elementary analysis, to be one corresponding to the theoretical formula $C_{21}H_{19}O_3N_3$ having the following structure

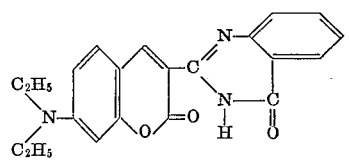

The compound emitted yellow fluorescence and by dyeing acetate fibers, polyester fibers or polyamide fibers with the compound, the fibers were provided with a fluorescent light-yellow tone and also they showed excellent fastness to sunlight, sublimation and washing.

When the same procedure as above was followed using carboxyacetic acid anilide, carbomethoxyacetic acid anilide or carbamoylacetic acid anilide instead of cyanoacetic acid anilide, similar cumarin derivatives were obtained.

EXAMPLES 92–106

Examples of the valuable novel dyestuffs prepared by the similar processes to above are shown in the following table:

| Ex. | R₁ | R₂ | A |
|---|---|---|---|
| 92 | —CH₃ | —CH₃ | —C₆H₄—OCH₃ |
| 93 | —CH₃ | —CH₃ | —C₆H₄—CH₃ |
| 94 | —CH₃ | —CH₃ | —C₆H₄—Cl |
| 95 | —C₂H₅ | —C₂H₅ | —C₆H₄—SO₂CH₃ |
| 96 | —C₂H₅ | —C₂H₅ | —C₆H₄—SO₂N(CH₃)₂ |
| 97 | —C₂H₄CN | —CH₃ | —C₆H₅ |
| 98 | —C₂H₄Cl | —CH₃ | —C₆H₅ |
| 99 | —C₂H₄OH | —CH₃ | Same as above. |
| 100 | —C₆H₄—CH₂— | H | Do. |
| 101 | | H—C₆H₄—H (ring) | Do. |
| 102 | | O(CH₂CH₂)₂N— (morpholino) | Do. |
| 103 | —CH₃ | —CH₃ | —C₆H₄—COOCH₃ |
| 104 | —C₂H₅ | —C₂H₅ | —C₆H₄—CO·CH₃ |
| 105 | —C₂H₅ | —C₂H₅ | —C₆H₄—Cl (ortho) |
| 106 | —C₂H₅ | —C₂H₅ | —C₆H₄—CH₃ (ortho) |

EXAMPLE 107

A mixture of 19.3 parts of cyanoacetic acid α-naphthylamide and 9.7 parts of 4-diethylamino-2-hydroxybenzaldehyde was mixed with 150 parts of dioxane and after adding dropwise 1.0 parts of piperidine to the mixture with stirring, the resultant mixture was stirred for 6 hours at 75–80° C. The reaction product was cooled to normal temperature and the precipitates deposited were recovered by filtration and washed well with 50 parts of dioxane to provide the yellow crystals of α-carbo-α'-napthylamido-β-(2'-hydroxy-4'-diethylaminophenyl)-acrylonitrile. When the compound was recrystallized from chlorobenzene, the crystals of the pure compound having a melting point of 177–179° C. were obtained.

In a mixture of 352 parts of water and 21.5 parts of 55% hydrochloric acid was added 19.3 parts of the product and then the system was heated for 6 hours at 95–100° C. After cooling, the product was neutralized with sodium acetate and crystals thus formed were recovered by filtration and washed with water to provide the yellow crystals of 3-carbo-α-napthylamido-7-diethylaminocumarin having a melting point of 202–204° C.

Thereafter, 15.4 parts of the product was added to 150 parts of toluene together with 10.8 parts of urethane and after adding thereto 44.8 parts of phosphorus pentoxide with stirring, the system was refluxed for 12 hours at 110° C. to form a quinazolinone ring.

When the reaction product was poured in ice-cooled water and the solution was neutralized with an aqueous sodium hydroxide solution, the product was obtained as yellow crystals, which were then recrystallized from a mixed solvent of toluene and pyridine. The pure product was obtained as the beautiful yellow crystals. The compound thus prepared showed a single component on a thin-layer chromatograph and was confirmed by elementary analysis to be one corresponding to a theoretical formula $C_{25}H_{21}O_3N_3$ having the following structure

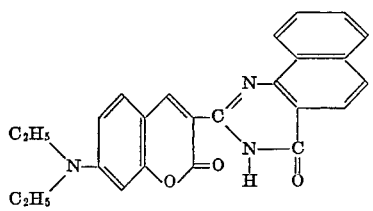

The compound emitted a yellow fluorescence and when acetate fibers, polyester fibers or polyamide fibers were dyed with the compound, the fibers were provided with a fluorescent light yellow tone and also showed excellent fastness to sunlight, sublimation and washing.

EXAMPLE 108

After grinding into sufficiently fine particles 0.1 part of the dyestuff shown by the following formula

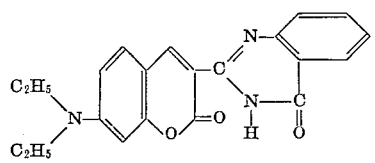

together with a suitable dispersing agent such as 0.2 part of a condensation product of naphthalene-sulfonic acid and formaldehyde, the particles thus prepared were added to 400 parts of water having immersed therein 10 parts of polyethylene terephthalate fibers, whereby the fibers were dyed for 60 minutes at 120–130° C. under pressure. After soaping the fibers at 90° C., they were washed with water and dried.

The fibers thus dyed had a fluorescent light yellow tone showing very excellent fastness to sunlight, sublimation and washing.

EXAMPLE 109

After grinding 0.1 part of the dyestuff having the following formula

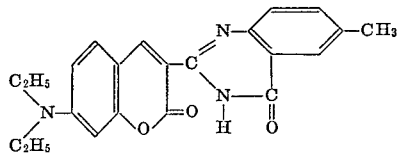

together with a dispersing agent as in Example 108, the fine particles prepared were added to a mixture of 400 parts of water and 1 part of a carrier such as trichlorobenzene to provide a dyeing bath. In the dyeing bath were immersed 10 parts of polyethylene terephthalate fibers and the dyeing procedure was conducted for 90 minutes at 98–100° C. After soaping at 90° C., the fibers thus dyed were washed with water and dried.

The articles thus dyed had a fluorescent very light yellow tone, showing quite excellent fastness to sunlight, sublimation and washing.

Moreover, the dyeing procedure for cellulose diacetate was carried out by immersing the fibers in 400 parts of water containing the dyestuff prepared above and maintaining the system at 80–85° C. for 90 minutes. After soaping the fibers, they were washed with water and dried.

The articles thus dyed had a fluorescent very light yellow tone showing very excellent fastness to sunlight, sublimation and washing.

Furthermore, polyamide fibers or cellulose triacetate fibers were dyed as follows: that is, the dyestuff prepared above was added to 400 parts of water and after immersing the fibers in the solution, the system was maintained at the boiling state for 90 minutes. After soaping the fibers, they were washed with water and dried.

The article thus dyed had also a fluorescent very light yellow tone showing very excellent fastness to sunlight, sublimation and washing.

EXAMPLE 110

In 100 parts of water was dispersed 1 part of the dyestuff having the following formula

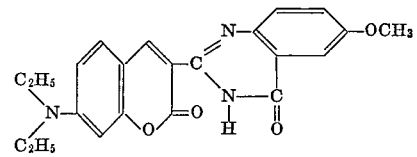

together with a dispersing agent as in Example 108. After heating the dispersion to 50–60° C., a fabric of polyethylene terephthalate fibers was padded with the dispersion, squeezed, and dried at 100° C. Then, the system was maintained at 200–210° C. for 30 seconds to conduct the dyeing. After soaping the fabric thus dyed was washed with water and dried.

The fabric thus obtained had a fluorescent yellow tone showing very excellent fastness.

The compound could also be used for dyeing various fibers according to the procedures as Examples 108 and 109.

EXAMPLE 111

A pasty dispersion of the fine particles of a dyestuff having the following formula

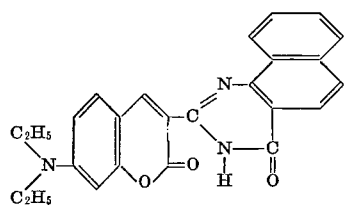

was prepared and after kneading the paste with a suitable starch paste and water, the mixture was applied to a fabric of polyethylene terephthalate fibers by padding.

The fabric thus dyed was dried and subjected to steaming for 60 minutes at 108–115° C. After soaping the fabric, it was washed with water and dried.

The dyed fabric had a fluorescent very light yellow tone showing fastness to sunlight, sublimation, and washing.

EXAMPLES 112–136

By using the dyestuffs of the present invention shown in the table below, the dyeing or textile printing of cellulose acetate fibers, polyester fibers and polyamide fibers can be practiced in the same manner as in Examples 108–111.

The articles dyed or textile printed had a fluorescent light yellow tone showing very excellent fastness to sunlight, sublimation and washing.

In the table, the compounds are shown by $R_1$, $R_2$ and ring A in the general Formula I.

| Ex. | $R_1$ | $R_2$ | A |
|---|---|---|---|
| 112 | —$CH_3$ | —$CH_3$ | —C₆H₄—$OCH_3$ |
| 113 | —$CH_3$ | —$CH_3$ | —C₆H₄—Cl |
| 114 | —$C_2H_5$ | —$C_2H_5$ | —C₆H₄—$SO_2CH_3$ |
| 115 | —$C_2H_5$ | —$C_2H_5$ | —C₆H₄—$SO_2N(CH_3)_2$ |
| 116 | —$C_2H_4CN$ | —$CH_3$ | —C₆H₄—$SO_2NH_3$ |
| 117 | —$C_2H_4Cl$ | —$CH_3$ | —C₆H₄— |
| 118 | —$C_2H_4OH$ | —$CH_3$ | Same as above. |
| 119 | C₆H₅—$CH_2$— | H | —C₆H₄—$SO_2NHC_2H_5$ |
| 120 | C₆H₁₀—H | H | —C₆H₄—$CONH_2$ |
| 121 | —$CH_3$ | —$CH_3$ | —C₆H₄—$COOCH_3$ |
| 122 | —$C_2H_5$ | —$C_2H_5$ | —C₆H₄—$CO·CH_3$ |
| 123 | —$C_2H_5$ | —$C_2H_5$ | —C₆H₄—Cl (o-Cl) |
| 124 | —$C_2H_5$ | —$C_2H_5$ | —C₆H₄—$CH_3$ (o-$CH_3$) |
| 125 | —$C_2H_5$ | —$C_2H_5$ | —C₆HCl₄ (tetrachloro) |
| 126 | —$C_2H_5$ | —$C_2H_5$ | —C₆H₄—$NO_2$ |
| 127 | —$C_2H_5$ | —$C_2H_5$ | —C₆H₄—SCN |
| 128 | —$C_2H_5$ | —$C_2H_5$ | —C₆H₃($NO_2$)—$OCH_3$ |
| 129 | —$C_2H_5$ | —$C_2H_5$ | —C₆H₃(Br)—Br |

TABLE—Continued

| Ex. | R₁ | R₂ | A |
|---|---|---|---|
| 130 | —C₂H₄OCH₃ | —C₂H₄OCH₃ | 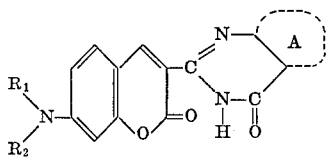 |
| 131 | —C₂H₄OCOCH₃ | —C₂H₄OCOCH₃ | Same as above. |
| 132 | —C₂H₄COOCH₃ | —C₂H₄COOCH₃ | Do. |
| 133 | | 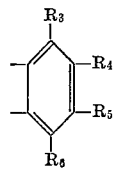 (morpholino) | Do. |
| 134 | | (piperazino) | Do. |
| 135 | —CH₃ | —CH₃ | 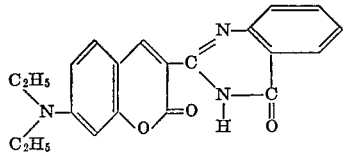 |
| 136 | —C₂H₅ | —C₂H₄CN | (naphthyl) |

What is claimed is:

1. A compound having the formula:

wherein R₁ and R₂ each is selected from the group consisting of hydrogen, $C_1$-$C_4$ alkyl, halo-, hydroxy- or cyano-substituted $C_1$-$C_4$ alkyl, $C_3$-$C_5$ alkoxyalkyl, alkanoyloxy alkyl having from 3 to 9 carbon atoms, $C_1$-$C_3$ alkoxycarbonyl $C_1$-$C_4$ alkyl, benzyl, phenethyl, $C_5$-$C_7$ cycloalkyl and $C_1$-$C_4$ alkyl substituted $C_5$-$C_7$ cycloalkyl or R₁-R₂ together with the nitrogen atom upon which R₁ and R₂ are substituted form piperidino or morpholino, and A is a member selected from the group consisting of naphthylene and phenylene represented by the formula:

wherein R₃, R₄, R₅ and R₆ each represents a hydrogen atom, a halogen atom, $C_1$-$C_2$ alkyl, $C_1$-$C_2$ alkoxy, nitro, thiocyano, $C_2$-$C_3$ alkanoyl, $C_2$-$C_3$ carboalkoxy, carbamoyl, $C_1$-$C_2$ alkylsulfonyl, sulfonamide, $C_1$-$C_2$ N-alkyl or N,N-di-$C_1$-$C_2$-alkylsulfonamide.

2. A compound according to claim 1, wherein R₁ and R₂ each is methyl, ethyl, butyl, β-chloroethyl, β-hydroxyethyl, β-cyanoethyl, γ-cyanopropyl, β-methoxyethyl, β-acetoxyethyl, carbomethoxymethyl, benzyl or phenethyl.

3. A compound having the formula

4. A compound having the formula

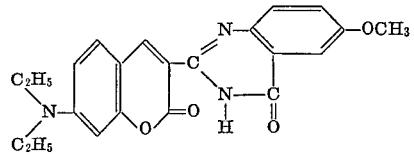

5. A compound having the formula

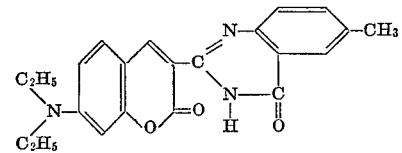

6. A compound having the formula

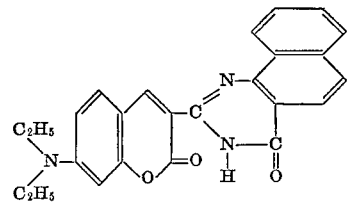

References Cited
UNITED STATES PATENTS
3,324,122  6/1967  Burch _____ 260—256.4 Q
3,464,989  9/1969  Hunter _____ 260—256.4 Q ALEX MAZEL, Primary Examiner
R. J. GALLAGHER, Assistant Examiner U.S. Cl. X.R.

8—55; 252—301.3; 260—40, 240 J, 240.9, 244 A, 247.1, 247.2 A, 247.2 B, 343.2 R